(No Model.)
J. W. KITTLER.
PROCESS OF PREPARING WHOLE GRAIN FOR FERMENTATION.
No. 330,334. Patented Nov. 10, 1885.
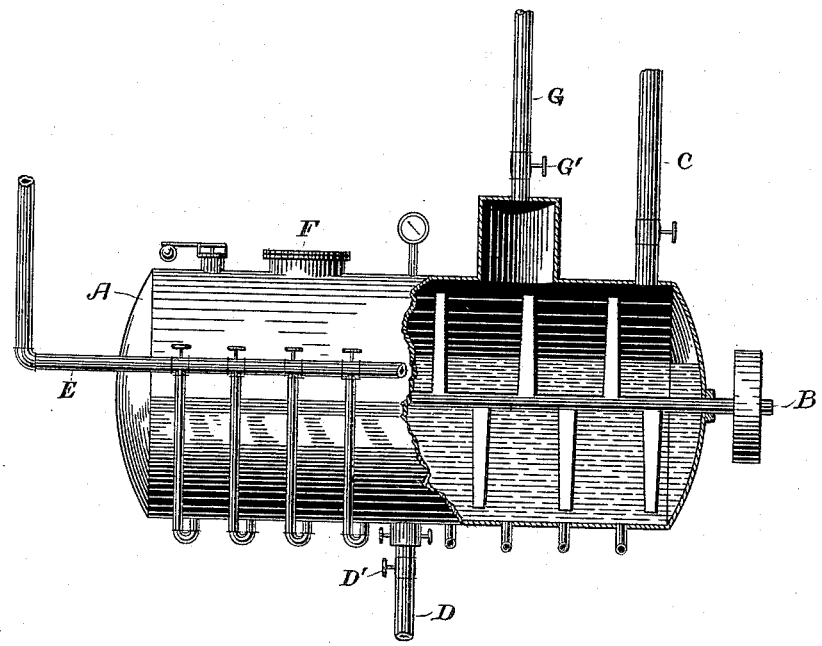
Witnesses:
L. D. Benner
A. Keithley
Inventor,
Julius W. Kittler,
per A. B. Upham,
His Attorney.

UNITED STATES PATENT OFFICE.

JULIUS W. KITTLER, OF PEORIA, ILLINOIS, ASSIGNOR OF FOUR-FIFTHS TO CHARLES J. ZIPPRICH, HERO JACOBS, JACOB UHL, AND HENRY MEYER, ALL OF SAME PLACE.

PROCESS OF PREPARING WHOLE GRAIN FOR FERMENTATION.

SPECIFICATION forming part of Letters Patent No. 330,334, dated November 10, 1885.

Application filed June 19, 1885. Serial No. 169,186. (No model.)

*To all whom it may concern:*

Be it known that I, JULIUS W. KITTLER, of Peoria, in the county of Peoria, in the State of Illinois, have invented an Improved Process of Preparing Whole Grain for Fermentation; and I hereby declare that the following is a full, clear, and exact description thereof, reference being had to the annexed drawings, making a part of this specification, in which like letters of reference refer to like parts, and in which—

Figure 1 represents an elevation of a cooker or digester by which my process can be carried out.

As usually performed the process of preparing grain and other substances containing sugar, starch, or ligneous tissue for vinous fermentation consists in first grinding the same as fine as possible and then digesting and macerating the same with water, and finally supplying thereto the malt and yeast principle. By this preliminary grinding there is not only a loss by the power expended in the grinding, but by the escaping starch-dust, by the burning in the cooking of the too-finely pulverized elements, and in other ways difficult to ascertain.

By my improved process, however, I am enabled to convert into alcohol almost the entire amount of the sugar, starch, and ligneous tissue contained in the grain or other organic substances, for by inserting the whole grain into the cooker and digesting and macerating the same with the suitable amount of water and without any previous pulverizing, I have no loss either by the escape of convertible dust or by any carbonization. By the term "whole grain" I mean to indicate grain which has not been subjected to any crushing or pulverizing force, but each kernel thereof is whole and unbroken. Although there have been attempts previous to mine to prepare whole grain for direct maceration and fermentation, there have none of them, so far as I am aware, been ultimately successful, nor have been brought into any general use.

My process consists, essentially, of first introducing the whole grain, with a suitable supply of water, into the cooker or digester adapted to be made air-tight, and of cooking the same therein for a definite length of time with a free communication to the exterior atmosphere, then continuing for the same length of time the cooking with the digester almost closed, and, finally, just before the introduction of the small grain and subsequent ordinary process, in cooking with the digester closed and under a high pressure.

In the drawings, A represents a cooker, B the horizontal shaft and stirrer-arms mounted thereon.

F is the man-hole for the introduction of the corn or grain.

C is the water-pipe.

G is the vapor-escape pipe, and G' the valve for closing the said pipe.

D is the mash-outlet pipe, having valve D', and E is the steam-pipe having valve-supplied branch-pipes leading therefrom to the cooker A.

Removing the man-hole plate from the man-hole F, the whole corn is introduced therethrough into the cooker, and water in the proportion of about fifty-six quarts to the bushel of corn, let in through the pipe C. The stirrer-arms are then set to revolving to agitate the contents of the cooker A, and steam is let in through the pipe E and its branches to cook and digest the corn. The man-hole F being open all the time, this cooking is kept up for about one hour, at the end of which time said man-hole is closed and the valve G' turned until almost closed. The cooking under this modified condition is now continued for one hour more. During this second step the valve, or a slight unfastening of the man-hole plate, so controls the vapor-escape from the cooker that the pressure therein rises no higher than sixty pounds per inch, and the temperature keeps at 312° Fahrenheit, and this temperature and pressure, or a very close approximation thereto, I maintain for the entire hour. At the end of this second hour, or thereabout, the valve G' is entirely closed, so that there is no outlet to the cooker A, and the pressure therein from the entering stream increases to several atmospheres. There being no escape for the vapor, the temperature, as well as the pressure, is rapidly increased, and the stirrer being still in motion, this third step in my process to 316° Fahrenheit and sixty-five pounds is brought to a close at the end of, approximately, fifteen minutes. This also ends what is distinctively my part of the process, after this coming the ordinary treatment with malt preparatory to the conveying thereof to the fermenting-tubs, for now the valve G' is opened wide and the vapor allowed to escape from the cooker through the pipe G, and when no more will pass out the vacuum-pump rapidly lowers the atmospheric pressure within the tank until the pressure and the resulting temperature are sufficiently reduced to permit of the intermixture with the malt. The malt or small grain is introduced into the cooker through the pipe C, and after the maceration thereof the now fully-prepared mash is drawn off through the pipe D and introduced into the fermenting-tubs.

Although I have described corn alone as being prepared by my process, grain, potatoes, beets, and all other alcohol-producing substances can be treated in substantially the same way. In the case of potatoes, beets and other succulent vegetables, little or no water need be added in the cooking and digesting thereof.

What I claim as my invention, and for which I desire Letters Patent is as follows, to wit:

1. The within-described process of preparing vegetable substances for vinous fermentation, which process consists in first cooking and digesting the unpulverized vegetable substances in an open vessel at a temperature of 212° Fahrenheit, then in a vessel having but a slight vapor-escape and at a temperature of 312°, and in continuing the cooking and digesting in a closed vessel at a temperature of 316° Fahrenheit, substantially as and for the purpose specified.

2. The within-described process of preparing vegetable substances for vinous fermentation, which process consists in first cooking and digesting the vegetable substances for one hour under a normal atmospheric pressure and at a temperature of 212° Fahrenheit, continuing for another hour the cooking and digesting under a pressure of sixty pounds and at a temperature 312°, and, finally, cooking for fifteen minutes under a pressure of sixty-five pounds and at a temperature of 316°, as set forth.

In testimony that I claim the foregoing as my invention I have hereunto set my hand this 11th day of June, A. D. 1885.

JULIUS W. KITTLER.

In presence of—
  A. KEITHLEY,
  A. B. UPHAM.